US007190507B2

United States Patent
Sato

(10) Patent No.: US 7,190,507 B2
(45) Date of Patent: Mar. 13, 2007

(54) DEFLECTION MIRROR, A DEFLECTION MIRROR MANUFACTURING METHOD, AN OPTICAL WRITING APPARATUS, AND AN IMAGE FORMATION APPARATUS

(75) Inventor: Yukito Sato, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 27 days.

(21) Appl. No.: 11/082,765

(22) Filed: Mar. 18, 2005

(65) Prior Publication Data

US 2005/0231793 A1  Oct. 20, 2005

(30) Foreign Application Priority Data

Mar. 19, 2004  (JP) .............................. 2004-081466

(51) Int. Cl.
*G02B 26/00* (2006.01)

(52) U.S. Cl. ...................... 359/291; 359/224; 359/292; 359/295; 359/298

(58) Field of Classification Search ................ 359/291, 359/290, 292, 293, 295, 298, 220, 222, 223, 359/224, 320, 322, 323, 324
See application file for complete search history.

(56) References Cited

U.S. PATENT DOCUMENTS

| 6,928,198 | B2 * | 8/2005 | Ishikawa et al. ............... 385/4 |
| 6,969,629 | B2 * | 11/2005 | Kouma et al. ................ 438/50 |
| 2003/0053156 | A1 | 3/2003 | Satoh et al. | |
| 2003/0072066 | A1 | 4/2003 | Hayashi et al. | |
| 2003/0227538 | A1 | 12/2003 | Fujii et al. | |

FOREIGN PATENT DOCUMENTS

| JP | 7-92409 | 4/1995 |
| JP | 2924200 | 5/1999 |
| JP | 3011144 | 12/1999 |

OTHER PUBLICATIONS

Kurt E. Petersen, "Silicon Torsional Scanning Mirror", IBM J. RES. DEVELOP., vol. 24, No. 5, Sep. 1980, pp. 631-637.
Harald Schenk, et al., "An Electrostatically Excited 2D-Micro-Scanning-Mirror with an In-Plane configuration of the Driving Electrodes", IEEE, The 13th Annual International Workshop on MEMS 2000, 2000, pp. 473-478.
Henri Camon, et al., "Fabrication, Simulation and Experiment of a Rotating Electrostatic Silicon Mirror with Large Angular Deflection", IEEE, The 13th Annual International Workshop on MEMS 2000, 2000, pp. 645-650.
Gleb Vdovin, "Micromachined adaptive mirrors", http://guernsey.et.tudelft.nl/tyson4/index.html, Dec. 12, 1996, 16 Pages.

* cited by examiner

*Primary Examiner*—Ricky Mack
*Assistant Examiner*—Tuyen Tra
(74) *Attorney, Agent, or Firm*—Oblon, Spivak, McClelland, Maier & Neustadt, P.C.

(57) ABSTRACT

The present invention provides a deflection mirror including a mirror substrate having a mirror face that reflects a light, a beam, and a supporting member that supports the mirror substrate through the beam. A movable electrode is formed at a free side of the mirror substrate. A fixed electrode is operably linked through the movable electrode at a gap that is formed in the supporting member. The mirror substrate is driven by electrostatic force between the movable electrode and the fixed electrode and vibrates centering of the beam. An end of at least one of the fixed electrode and the movable electrode is smaller in the thickness direction than the other end.

13 Claims, 8 Drawing Sheets

216
(217)

B -------- B'

214
(215)

214    216
(215)  (217)

FIG.7A
FIG.7B
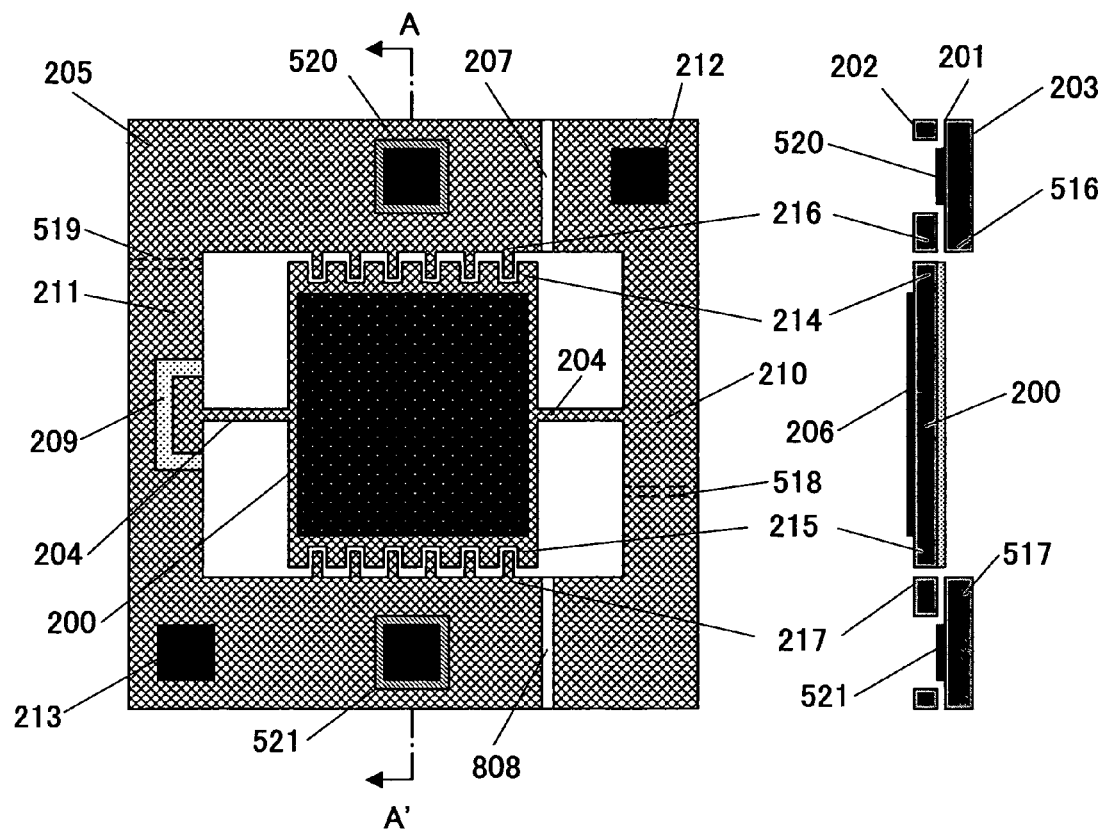
FIG.8
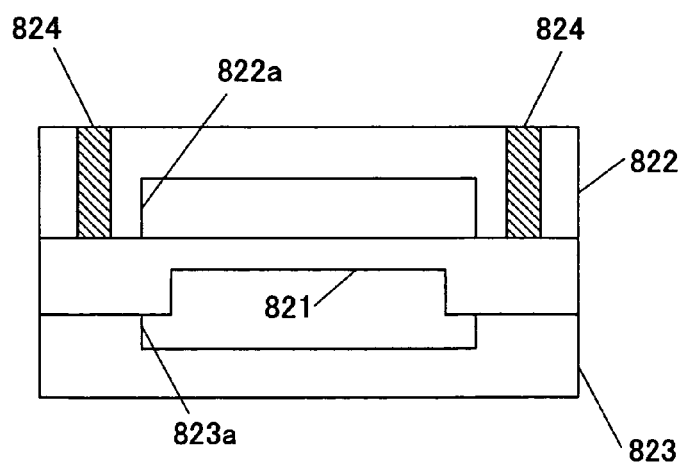

DEFLECTION MIRROR, A DEFLECTION MIRROR MANUFACTURING METHOD, AN OPTICAL WRITING APPARATUS, AND AN IMAGE FORMATION APPARATUS

BACKGROUND OF THE INVENTION

1. Field of the Invention

The present invention generally relates to a deflection mirror adopting a micro-machining technology, and an optical writing apparatus and an image formation apparatus therewith. The present invention especially relates to a deflection mirror wherein a mirror substrate supported by beams is driven by electrostatic force, and the mirror substrate vibrates with the beam being at the center; and an optical writing apparatus and an image formation apparatus therewith.

2. Description of the Related Art

According to a deflection mirror indicated by Non-Patent Reference 1, a mirror substrate is supported by two beams that are on the same straight line, and is reciprocated (vibrates) with the two beams serving as the axle of torsional rotation by electrostatic attraction between an electrode and the mirror substrate, the electrode facing the mirror substrate. This deflection mirror manufactured by the micro machining technology has features such as it is easy to miniaturize, its manufacturing cost is low, and the structure is simple as compared with optical scanners structured by a polygon mirror that is rotated by a motor, because the deflection mirror can be packaged as a semiconductor device. Further, a polygon mirror has a problem of precision between mirror faces. This problem is not a concern in the case of a deflection mirror. Furthermore, the deflection mirror is capable of high-speed scanning by reciprocation.

Other deflection mirrors that are driven by electrostatic force have been known as follows: a deflection mirror wherein a beam is shaped like a character "S", and rigidity is lowered such that a great deflection angle is obtained by small driving force (Patent Reference 1); a deflection mirror wherein the thickness of a beam is made smaller than the thickness of a mirror substrate and a frame substrate (Patent Reference 2); a deflection mirror wherein a driver electrode is arranged in a position that does not overlap with the vibrating direction of a mirror unit (Patent Reference 3 and Non-Patent Reference 2); and a deflection mirror wherein a driving electrode is arranged with an inclination from the central position of vibration of the mirror, lowering a driving voltage without changing the deflection angle of the mirror (Non-Patent Reference 3).

While the deflection mirrors described above use electrostatic attraction, other deflection mirrors that use electromagnetic force and a piezoelectric device as driving means are also devised.

Generally, these deflection mirrors that include a mirror substrate and a torsional (twisting) beam are driven so that a great deflection angle may be acquired with low energy, and the mirror substrate may be vibrated by a resonance frequency of the structure determined by material, form, and size of the mirror substrate and the torsional (twisting) beam.

[Patent Reference 1] Patent JP 2924200
[Patent Reference 2] JPA, 7-92409
[Patent Reference 3] Patent JP 3011144
[Non-Patent Reference 1] K. E. Petersen, "Silicon Torsional Scanning Mirror", IBM Journal of Research and Development 24, 1980, pp. 631–637
[Non-Patent Reference 2] Harald Schenk, "An Electrostatically Excited 2D-Micro-Scanning-Mirror with an In-Plane configuration of the Driving Electrodes", The 13th Annual International Workshop on MEMS 2000, (2000), pp. 473–478
[Non-Patent Reference 3] Henri CAMON, et al. "Fabrication, Simulation and Experiment of a Rotating Electrostatic Silicon Mirror with Large Angular Deflection", The 13th Annual International Workshop on MEMS 2000, (2000), pp. 645–650

In the case of a deflection mirror wherein a fixed driving electrode is arranged to counter a free side (a side that is not supported by the beam) of the mirror substrate, an area of the driving electrode can be made great by forming the free side (acting as a movable electrode) of the mirror substrate and the fixed driving electrode in the shape of comb-teeth such that they gear through (mesh without contacting) at a minute gap. The inventor hereto has filed Patent applications of deflection mirrors using the comb-teeth shaped electrode, e.g., JPA 2003-143326. Therein, the comb-teeth shaped fixed electrode is divided into two stages, namely an upper stage and a lower stage. In this manner, a stable and great deflection angle of the reciprocal vibration is obtained even if the vibration becomes out of the resonance point of the mirror substrate.

Here, a deflection angle $\theta$ of the mirror substrate is expressed by the following formula $$\theta = fK(\omega, \delta)/I, \text{ where}$$

f represents electrostatic force between the free side (movable electrode) of the mirror substrate and the fixed electrode, $\omega$ represents an angular velocity $\delta$ represents viscosity resistance of the vibration space of the mirror substrate, and I represents moment of inertia of the mirror substrate.

Accordingly, if the electrostatic force is increased, the angle $\theta$ increases.

Further, the following formula gives the electrostatic force f, $$f = \frac{1}{2}[\epsilon o(V/d)^2 S], \text{ where}$$

d represents a gap length between electrodes,

V represents a voltage between the electrodes, $\epsilon o$ represents the dielectric constant of vacuum, and S represents the area of the electrode.

The formula shows that the greater the electrode area, and the smaller the gap between electrodes, the greater the electrostatic force is.

Now, the mirror substrate is subject to deformation when vibrating by the moment of inertia. The deformation of the mirror substrate has direct influence on the quality of an optical beam reflected by the mirror substrate. It is required that the deformation of the mirror substrate be suppressed as much as possible, especially where the deflection mirror is used by a writing optical system, such as a laser beam printer that requires highly precise diameter and intensity distributions of the beam. For this purpose, it is effective to increase the thickness of the mirror substrate and to raise rigidity. However, this increases the mass, so that the moment of inertia of the mirror substrate increases, requiring higher driving electrostatic force, i.e., requiring a higher driving voltage.

SUMMARY OF THE INVENTION

It is a general object of the present invention to provide a deflection mirror, a deflection mirror manufacturing method, an optical writing apparatus, and an image formation apparatus that substantially obviate one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by a deflection mirror, a deflection mirror manufacturing method, an optical writing apparatus, and an image formation apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides a deflection mirror wherein a great thickness of a mirror substrate is maintained such that deformation due to vibration of the mirror substrate is suppressed, while a required driving voltage is maintained to be low. The deflection mirror is easy to manufacture, and includes a single-body structure that contains a mirror substrate that has a mirror face that reflects a light, a beam, a supporting member that supports the mirror substrate through the beam, a movable electrode that is shaped like comb-teeth formed in a free side of the mirror substrate, and a fixed electrode that is shaped like comb-teeth, and gears through with the movable electrode at a gap, the fixed comb-teeth-like electrode being formed in the supporting member, wherein the mirror substrate is driven by electrostatic force between the movable electrode and the fixed electrode, and vibrates centering on the beam.

Other purposes of the present invention are to offer an optical writing apparatus and an image formation apparatus that are improved using the improved deflection mirror of the present invention as deflection means of an optical beam.

Effect of the Invention

As specifically described in detail in relation to Embodiments of the present invention, effects of the present invention include (1) the present invention realizes a deflection mirror, deformation of the mirror substrate of which is suppressed providing small fluctuations of the diameter and intensity distribution of the laser beam, the deflection mirror operating at a low driving voltage and capable of being produced at low cost, (2) the deflection mirror according to the present invention can be mounted in a simple form, (3) according to the present invention, the viscosity resistance when the mirror substrate vibrates is reduced, further reducing the driving voltage; and invasion of dust, etc., from outside can be prevented, raising the reliability of the deflection mirror, (4) according to the present invention, high-speed writing by the optical beam with little fluctuation of the diameter and intensity distribution of the optical beam is possible; and a compact optical writing apparatus that excels in silence and power-savings is realized, and (5) according to the present invention, high speed and high-quality image formation is obtained, and an image formation apparatus excellent in silence and power-savings is realized.

BRIEF DESCRIPTION OF THE DRAWINGS

FIG. 7A is a plan view showing the outline of a deflection mirror according to Embodiment 3 of the present invention;

FIG. 7B is a cross-sectional view showing the outline of a deflection mirror according to Embodiment 3 of the present invention;

FIG. 8 is a cross-sectional view showing the outline of the deflection mirror according to Embodiment 4 of the present invention.

DESCRIPTION OF THE PREFERRED EMBODIMENTS

In the following, embodiments of the present invention are described with reference to the accompanying drawings.

Embodiment 1

Figure 1A:
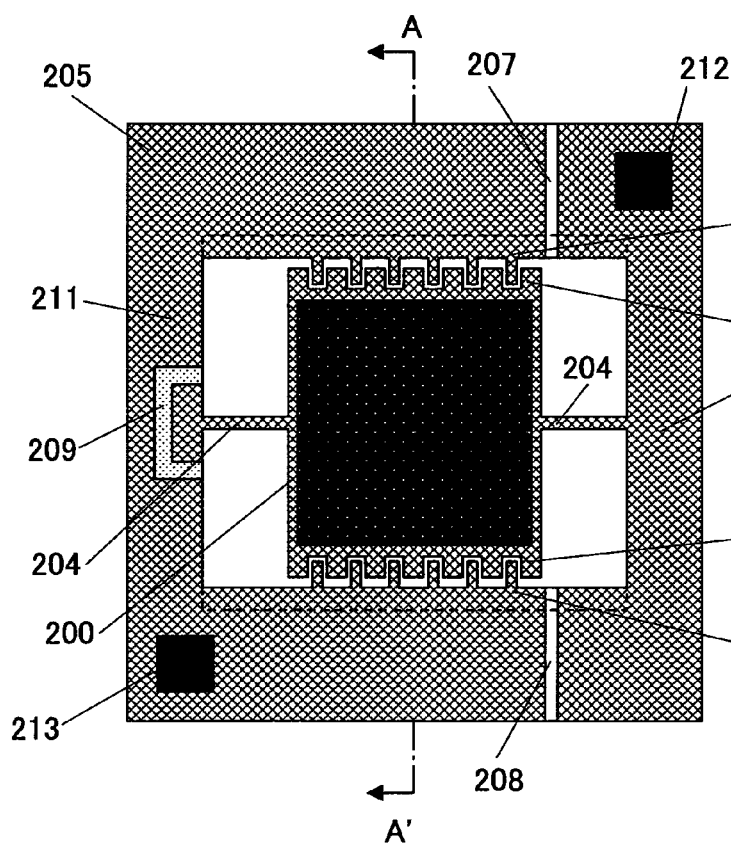
FIG. 1A is a plan view showing the outline of a deflection mirror according to Embodiment 1 of the present invention.
Figure 1B:
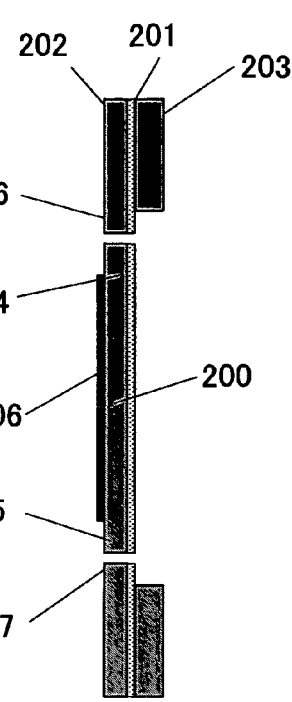
FIG. 1B is a cross-sectional view showing the outline of a deflection mirror according to Embodiment 1 of the present invention.
Figure 2A:
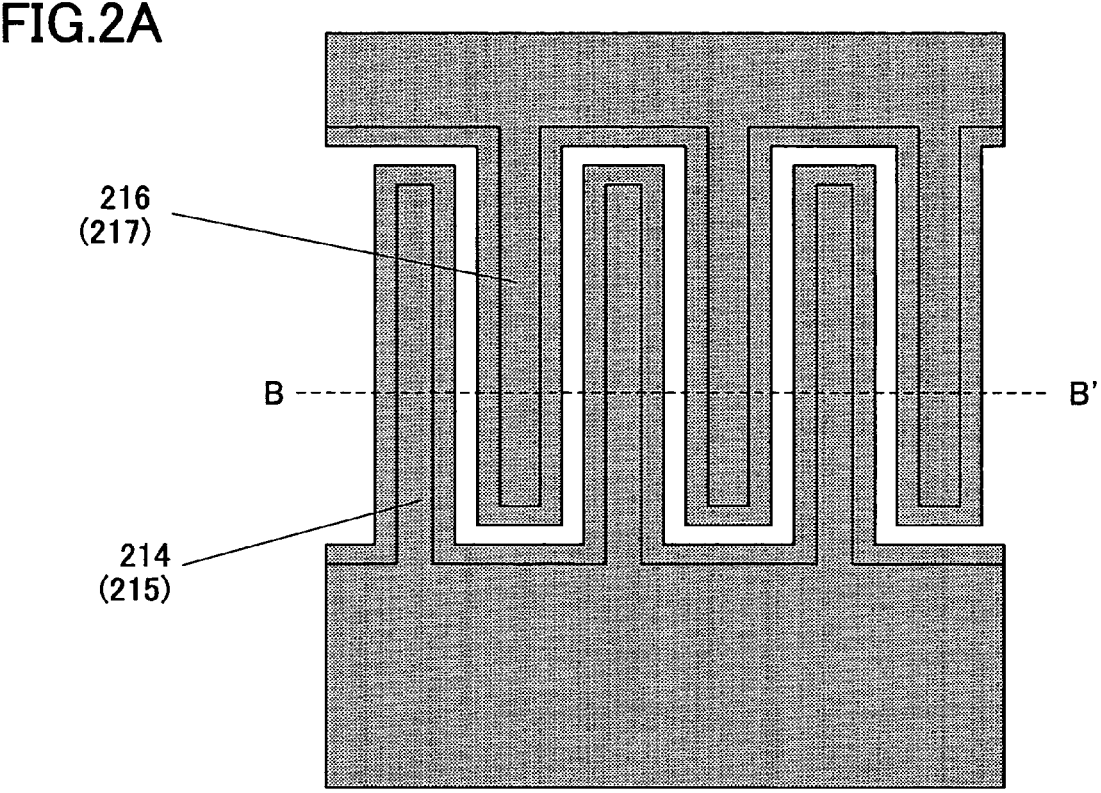
FIG. 2A is a plan view of electrodes of the deflection mirror according to Embodiment 1 of the present invention.
Figure 2B:
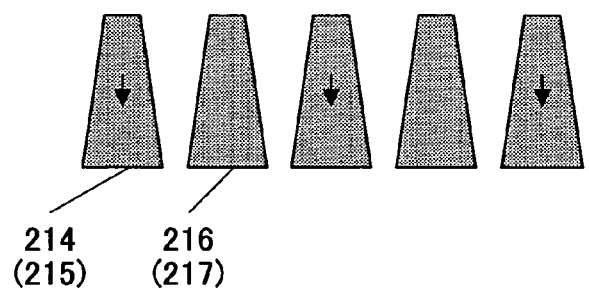
FIG. 2B is a cross-sectional view of the electrodes of the deflection mirror according to Embodiment 1 of the present invention.

The structure of the deflection mirror according to Embodiment 1 of the present invention is described with reference to FIGS. 1A, 1B, 2A and 2B. An outline plan of the deflection mirror is shown by FIG. 1A, a cross-sectional view taken along the A–A' line of which is shown by FIG. 1B. Further, FIG. 2A shows an electrode section of the deflection mirror, a cross-sectional view taken along the B–B' line of which is shown by FIG. 2B.

The deflection mirror according to Embodiment 1 includes a single-crystal-silicon substrate 202 of low resistance, and a single-crystal-silicon substrate 203 of medium resistance that are joined with an oxide film 201 in between, forming a one-body structure. Single-crystal-silicon substrates have properties such as they can be precisely processed, they have rigidity appropriate to use as an elastic body, and they can serve as an electrode by lowering resistance. For these reasons, the deflection mirror of Embodiment 1 is realized by using the single-crystal-silicon substrates.

The deflection mirror according to Embodiment 1 includes
a mirror substrate 200,
two beams 204 and 204 arranged in the same straight line in order to support the central part of two opposite sides (edges) of the mirror substrate 200, and
a frame section 205 that encloses the mirror substrate 200 at the circumference, and supports the mirror substrate 200 through the two beams 204 and 204,
all of which are formed in one-body from the single-crystal-silicon substrate 202. The mirror substrate 200 can rock (twist) with the beams 204 and 204 serving as the axle of torsional rotation. Dimensions of the mirror substrate 200 and the beams 204 and 204 are set up so that the resonance frequency required of the deflection mirror may be obtained.

A mirror face 206 that consists of a metal thin film that has sufficient reflection factor of a light to be used is formed on the whole surface of the mirror substrate 200. Further, the frame section 205 is divided into two sections, namely, a conductive section 210 that has electric conductivity to the mirror substrate 200, and an insulated section 211 that is electrically insulated from the mirror substrate 200. The two sections are divided by slits 207, 208, and 209 that penetrate the single-crystal-silicon substrate 202. Contact pads 212 and 213 are formed in the conductive section 210 and the insulated section 211, respectively. The contact pads 212 and 213 consist of metal thin films, and are formed after removing oxide films in order to expose the surface of the silicon substrate 202.

Movable electrodes 214 and 215 are formed on the free edges (free sides) of the mirror substrate 200, which free sides are the sides that are not supported by the beams 204 and 204, respectively. The movable electrodes 214 and 215 are shaped like comb-teeth. Fixed electrodes 216 and 217 are formed at positions of the frame section 205, the positions countering the movable electrodes 214 and 215, respectively, such that the fixed electrodes 216 (and 217) gear through (mesh without contacting) with the movable electrodes 214 (and 215), respectively, at minute gaps. The single-crystal-silicon crystal-silicon substrate 203 is bonded to the back of the frame section 205 of the single-crystal-silicon substrate 202 through the oxide film 201 so that the frame section 205 may be supported. The single-crystal-silicon substrate 203 is formed in approximately the same plane form as the frame section 205 such that rocking of the mirror substrate 200 is not interfered with.

As shown in FIG. 2B, the cross-sectional forms of the movable electrodes 214 and 215 and the fixed electrodes 216 and 217 are shaped like trapezoids, that is, the width (measured in the thickness direction) expands gradually from one end to the other end, e.g., from front (upper end) to rear (lower end) of each substrate. In this manner, the gaps between the electrodes are the greatest at the upper ends of the fixed electrodes 216 and 217, continuously decrease toward the lower ends, and become the smallest at the lower ends. Since electrostatic force acts the strongest where the gap between the electrodes is the smallest, lowering of the driving voltage can be attained by controlling the width of the smallest gap between the electrodes with high precision to a predetermined width that is set at a sufficiently small value. Since the cross-sectional form of each electrode is trapezoid-like, the board thickness of the mirror substrate 200 becomes great, reducing the deformation due to vibration of the mirror substrate 200, and even if the depth of the gap between the electrodes (length in the vertical direction in FIG. 2B) becomes great, precise control of the width of the gap at the lower end to the predetermined width is possible. This is described in more detail below in relation to the manufacturing method of the deflection mirror.

FIGS. 3A through 3I are cross-sectional views for explaining an example of the manufacturing method of the deflection mirror according to Embodiment 1. Along with these drawings, the manufacturing process of the deflection mirror is sequentially described.

Figure 3A:
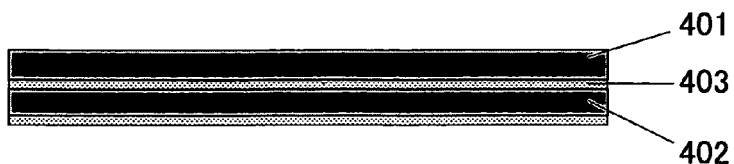
FIG. 3A through FIG. 3I are cross-sectional views showing a manufacturing method of the deflection mirror according to Embodiment 1 of the present invention.

Process shown by FIG. 3A: A low resistance single-crystal-silicon substrate 401 and a medium resistance single-crystal-silicon substrate 402 that are 525 μm thick are thoroughly cleaned.

A thermal oxidation film 403 is formed on both upper and lower surfaces of the single-crystal-silicon substrate 402 at the thickness of 5000 Å. The two single-crystal-silicon substrates 401 and 402, maintaining the degree of cleanliness, are put in contact with the thermal oxidation film 403 in between, and are temporarily bonded under reduced pressure. Then, a heat treatment at 1100° C. is carried out such that they are directly bonded. Hereafter, the bonded body of two single-crystal-silicon substrates 401 and 402 may be called a silicon wafer.

Figure 3B:

Process shown by FIG. 3B: The low resistance single-crystal-silicon substrate 401, being one of the surfaces of the silicon wafer, from which a mirror substrate, a beam, and a frame section are formed, is ground and polished to 100 μm thickness by a lapping-polishing apparatus.

Figure 3C:

Process shown by FIG. 3C: A thermal oxidation film 404 is formed in thickness of 5000 Å on the surface of the silicon wafer after bonding and polishing. That is, the thermal oxidation film 404 to be used as an etching mask is formed on the surface of the silicon substrate 401 of the polished side. As for the thermal oxidation film of the silicon substrate 402 that is not ground and polished, thickness is increased from 5000 Å of the first stage.

Figure 3D:

Process shown by FIG. 3D: The thermal oxidation film 404 of the silicon substrate 401 is patterned by a resist mask. Specifically, portions of the thermal oxidation film 404 corresponding to the beams 204 and 204, the circumference of the mirror substrate 200, the inner side of the frame section 205, and the slits 207, 208, and 209 are removed by dry etching using "CF4+H2" gas.

Figure 3E:

Process shown by FIG. 3E: By using the thermal oxidation film 404 after patterning at the above-mentioned process as a mask, penetration etching of the single-crystal-silicon substrate 401 is carried out until it reaches the oxide film 403. Although a rapid deep etching apparatus alternately using high-density plasma of SF6 and C4F8 is used for this etching, since the oxide film 403 has a great etching selectivity ratio to silicon, etching stops when the etching reaches the oxide film 403.

At this juncture, the movable electrodes 214 and 215 and the fixed electrodes 216 and 217 are substantially formed. Since the cross-sectional forms of the electrodes are shaped as shown in FIG. 2B, even if the board thickness of the mirror substrate (equivalent to the board thickness of the single-crystal-silicon substrate 401 at this process step) is thick, and the etching depth becomes great, it is generally quite easy to precisely control the gap between the electrodes at the lower end of the fixed electrodes 216 and 217 to the predetermined width that is sufficiently small, as compared with the case wherein the cross-sectional form of the electrodes is uniform from the upper end to the lower end, and the gap between electrodes is to be controlled to the predetermined width that is sufficiently small from the upper end to the lower end.

Figure 3F:

Process shown by FIG. 3F: Patterning is performed on the thermal oxidation film formed on the single-crystal-silicon substrate 402 with a resist mask, and the oxide film inside the frame section 205 is removed by dry etching using CF4+H2 gas.

Figure 3G:

Process shown by FIG. 3G: Penetration etching is carried out on the single-crystal-silicon substrate 402 until etching reaches the oxide film 403. This is carried out by position matching by both sides alignment according to the form of the processed single-crystal-silicon substrate 401, and by the oxide mask, having a thickness of 5000 Å, that is patterned with the resist mask. At this time, etching removal of the single-crystal-silicon substrate 402 is carried such that the fixed electrodes 216 and 217 are sufficiently cleared, the fixed electrodes 216 and 217 being formed in the frame section-205 of the single-crystal-silicon substrate 401. For this etching, the rapid deep etching apparatus providing the high-density plasma of alternating SF6 and C4F8 is used. Since the oxide film 403 that interfaces the single-crystal-silicon substrates 401 and 402 has a great etching selection ratio to silicon, when etching reaches the oxide film 403, etching is stopped.

Figure 3H:

Process shown by FIG. 3H: A portion of the oxide film 403, the portion holding the mirror substrate 200, the circumference of which is penetrated, is removed by wet etching by hydrofluoric acid. In this manner, the mirror substrate 200 is completely separated from the frame section 205, and becomes capable of rocking centering on the beams 204 and 204. Further, the thermal oxidation films on the surface of the single-crystal-silicon substrates 401 and 402 are simultaneously removed by etching.

Figure 3I:
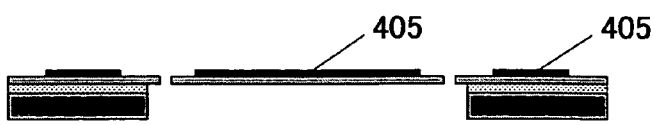

Process shown by FIG. 3I: Aluminum thin films 405 serving as the mirror face 206 and the contact pads 212 and 213 are formed on the mirror substrate 200 and at predetermined places, respectively, on the frame section 205 of the single-crystal-silicon substrate 401 on which the etching removal of the oxide film has been performed, by mask membrane formation by spattering. Here, although the aluminum thin films 405 are formed by spattering, other materials such as Au can be used, and other film forming methods such as a vacuum deposition method and an ion plating method may be used as long as sufficient conductivity and sufficient adhesion to the single-crystal-silicon substrate 401 are obtained.

It is also possible to provide a manufacturing process that performs etching for forming each electrode in the single-crystal-silicon substrate 401 from the side of the single-crystal-silicon substrate 402, to which an etching process like the process shown by FIG. 3G has been performed. In this case, the cross-sectional form of the electrodes will be, for example, an inverted trapezoid, that is, an inversion of the shape shown in FIG. 2B. In this case, it is generally easy to control the gap between the electrodes at the upper end of the fixed electrode to the predetermined width that is sufficiently small. Further, the cross-sectional form of the electrodes is not necessarily limited to the trapezoid shape, be it inversed or not inversed. The same effect can be acquired if the cross-sectional form of at least one of the electrodes is trapezoid-like, or the width at the upper end (or lower end) is smaller than the lower end (or upper end).

In addition, by choosing a method and conditions of etching, an etching process wherein an etching range is expanded to a width direction as the etching depth increases can be provided. According to such etching process, it is far easier to control the gap between the electrodes to the predetermined width that is small enough than the case wherein the gap between electrodes has to be controlled sufficiently small over the whole region in the electrode thickness direction.

Next, driving of the deflection mirror according to Embodiment 1 is described. The driving method of the deflection mirror according to Embodiment 1 is fundamentally the same as that of the conventional deflection mirror of the same kind. That is, the contact pad 212 is grounded. The frame section 205, the beams 204 and 204, and the mirror substrate 206 have the same potential as each other, being formed in one body by the single-crystal-silicon substrate 203 having a low resistance. If a pulse voltage is applied to the contact pad 213 that has the same potential as the fixed electrodes 216 and 217 of the frame section 205, an electrostatic attraction occurs between the fixed electrodes 216 and the movable electrodes 214, both countering each other as they gear through at a minute gap, and an electrostatic attraction occurs between the fixed electrodes 217 and the movable electrodes 215, both countering each other as they gear through at a minute gap. At this time, since there may be a slight initial position gap between the electrodes 216 and 214, and a slight initial position gap between the electrodes 217 and 215, an angular moment acts on the mirror substrate 200 in directions in which both slight initial gaps are minimized, and the mirror substrate 200 is started. That is, vibration of the mirror substrate 200 starts. Then, the mirror substrate 200 sways (rocks) by resonance vibration, increases the rocking angle, and the vibration stabilizes at a certain rocking angle. Here, according to the deflection mirror of Embodiment 1, the gap between the fixed electrodes 216 (and 217) and the movable electrodes 214 (and 215), respectively, can be made sufficiently small at portions where the width of these electrodes is greatest. For this reason, the thickness of the mirror substrate 200 can be made great in order to suppress deformation due to vibration of the mirror substrate 200, while sufficient electrostatic force is obtained by a low voltage between the respective electrodes. In this manner, a sufficient deflection angle of the mirror substrate 200 is obtained by the low driving voltage.

[Embodiment 2]

Figure 4A:
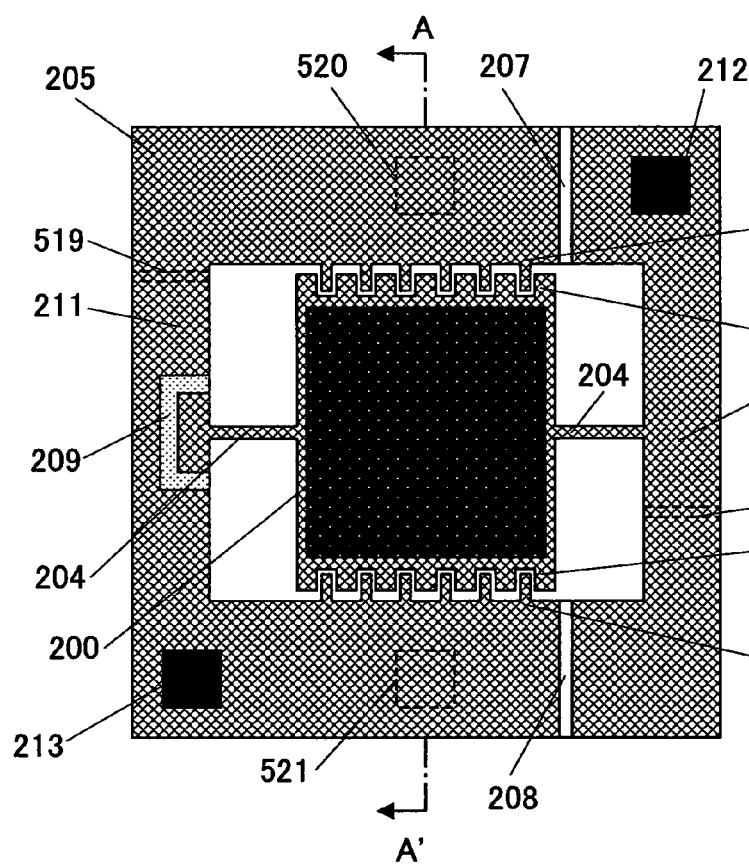
FIG. 4A is a plan view showing the outline of a deflection mirror according to Embodiment 2 of the present invention.
Figure 4B:
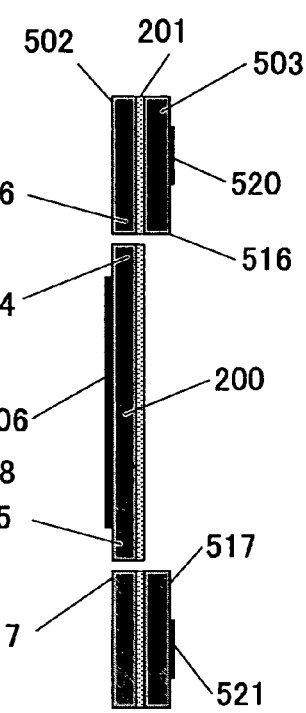
FIG. 4B is a cross-sectional view showing the outline of a deflection mirror according to Embodiment 2 of the present invention.
Figure 5A:
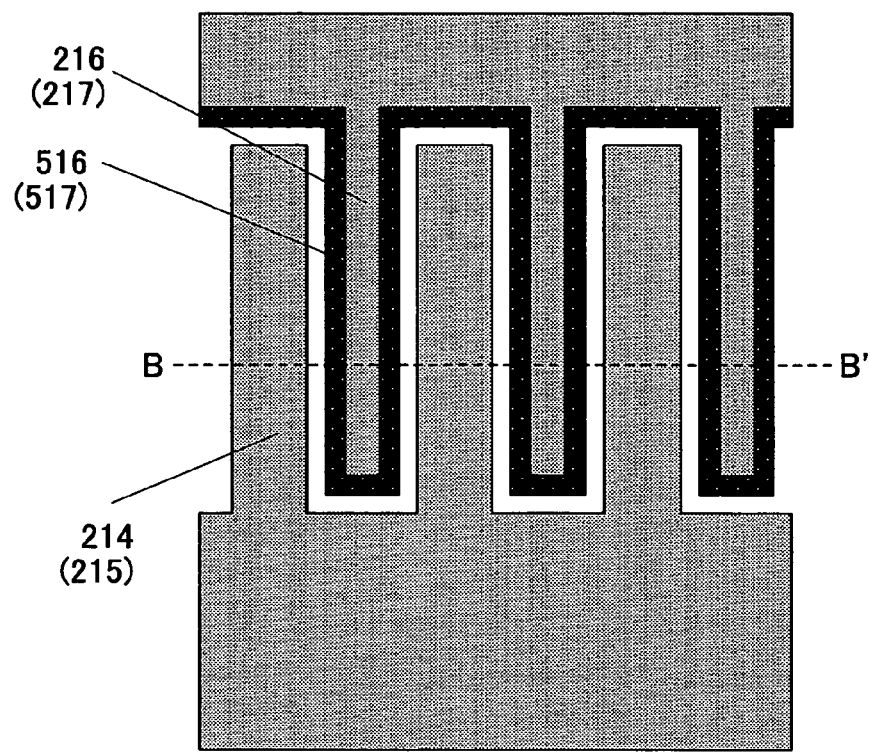
FIG. 5A is a plan view of electrodes of the deflection mirror according to Embodiment 2 of the present invention.
Figure 5B:
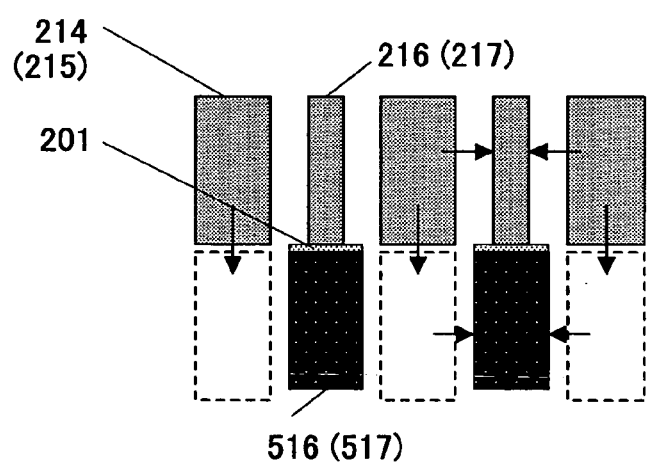
FIG. 5B is a cross-sectional view of the electrodes of the deflection mirror according to Embodiment 2 of the present invention.

The structure of the deflection mirror according to Embodiment 2 of the present invention is described with reference to FIGS. 4A, 4B, 5A and 5B. An outline plan of the deflection mirror is shown by FIG. 4A, a cross-sectional view taken along the A–A' line of which is shown by FIG. 4B. Further, FIG. 5A shows an electrode section of the deflection mirror, a cross-sectional view taken along the B–B' line of which is shown by FIG. 5B.

In order to clarify differences of the structure of the deflection mirror according to Embodiment 2 from the deflection mirror according to Embodiment 1, the same reference numbers are given in FIG. 4 and FIG. 5 to the same portions as or the corresponding portions to FIG. 1 and FIG. 2.

The differences between the deflection mirror according to Embodiment 2 and the deflection mirror according to Embodiment 1 include that (1) the thickness of the fixed electrodes is greater than the thickness of the movable electrodes, (2) the width of a portion of the fixed electrodes, the portion not countering the movable electrodes, is greater than the width of the area that counters the movable electrodes when the mirror substrate is not in motion (e.g., when manufacturing the deflection mirror), and (3) the fixed electrodes are divided into two portions in the directions of thickness, the portions being insulated from each other. The portions are divided bordering at the position of a level difference.

With reference to FIG. 4A and FIG. 4B, the deflection mirror according to Embodiment 2 includes the single-crystal-silicon substrate 502 of low resistance and the single-crystal-silicon substrate 503 of low resistance that are bonded through the oxide film 201, all of which are formed in one body. Since a single-crystal-silicon substrate has an advantage such as highly precise detailed processing being possible, moderate rigidity adequately serving as an elastic body, and resistance being low such that it can serve as an electrode.
For this reason, Embodiment 2 also employs the single-crystal-silicon substrate in implementing the deflection mirror.

The one body structure is formed by the mirror substrate 200, two beams 204 and 204 arranged on the same straight line for supporting the central part of two countering sides of the mirror substrate 200, and the frame section 205 that surrounds the circumference of the mirror substrate 200 and supports the mirror substrate 200 through the beams 204 and 204, these items being formed from the silicon substrate 502. Dimensions of the mirror substrate 200, the beams 204 and 204 are set up so that resonance frequency required as the deflection mirror may be obtained.

The mirror face 206 is formed on the whole surface of the mirror substrate 200, consisting of a metal thin film that has a sufficient reflection factor for the light to be used. Further, the frame section 205 has the conductive area 210 that is electrically conductive to the mirror substrate 200 and the insulated area 211 that is insulated from the mirror substrate 200, structured by the slits 207, 208, and 209 that penetrate the silicon substrate 202. The conductive area 210 and the insulated area 211 have the contact pads 212 and 213, respectively, that consist of metal thin films.

The movable electrodes 214 and 215, which are shaped like comb-teeth, are formed at the countering sides (free edges) that are not supported by the beams 204 and 204 of the mirror substrate 200. The fixed electrodes 216 and 217, which are shaped like comb-teeth, and serve as upper fixed electrodes, are formed at a position of the frame section 205, the position countering the movable electrodes 214 and 215, respectively. The upper fixed electrodes 216 and 217 are positioned such that they gear through with the movable electrodes 214 and 215, respectively, at minute gaps when the mirror substrate 200 is not in motion (also when the deflection mirror is being manufactured).

The silicon substrate 503 is made into approximately the same plane form as the frame section 205 such that rocking of the mirror substrate 200 is not interfered with. Lower fixed electrodes 516 and 517, which are shaped like comb-teeth, are formed at a position corresponding to the upper fixed electrodes 216 and 217 such that the lower fixed electrodes 516 and 517 gear through with the movable electrodes 214 and 215, respectively, at minute gaps when the mirror substrate 200 vibrates. The lower fixed electrodes 516 and 517 are wider than the upper fixed electrodes 216 and 217, and are insulated from the upper fixed electrodes 216 and 217 by the oxide film 201.

As described above, the fixed electrodes according to Embodiment 2 are constituted by two-staged electrodes that are electrically separated, namely, the upper electrodes 216 and 217, and the lower electrodes 516 and 517, making a level difference at the position of the oxide film 201, and the lower electrodes 516 and 517 are made wider than the upper electrodes 216 and 217.

The silicon substrate 503 is divided into two sections by slits 518 and 519 that penetrate it, namely, a section that is electrically connected to the fixed electrode 516, and a section that is electrically connected to the fixed electrode 517. Contact pads 520 and 521 that consist of a metal thin film are formed in respective sections.

Further description about the fixed electrodes follows with reference to FIG. 5A and FIG. 5B. As shown in FIG. 5B, the widths (horizontal length in FIG. 5B) of the lower fixed electrodes 516 and 517 are greater than the upper fixed electrodes 216 and 217. Therefore, the gap between the fixed and movable electrodes becomes smaller when the mirror substrate 200 vibrates so that the movable electrodes 214 and 215 counter the lower fixed electrodes 516 and 517, respectively, as shown by dashed lines in FIG. 5B, than when the mirror substrate 200 is not in motion (e.g., when manufacturing the deflection mirror) so that the movable electrodes 214 and 215 counter the upper fixed electrode 216 and 217, respectively. Accordingly, by making the gaps between the lower fixed electrode 516 and 517 and the mirror substrate 200 sufficiently small, great electrostatic force is obtained between the electrodes, and the mirror substrate 200 can vibrate at a great deflection angle at a low voltage. Further, in the manufacturing stage of the deflection mirror, the movable electrodes 214 and 215 are not countering the lower fixed electrodes 516 and 517. For this reason, the interval between the teeth of the lower fixed electrodes 516 and 517 can be made sufficiently great; and it is easy to precisely control an etching process such that the gaps between the lower fixed electrodes (516 and 517) and the movable electrodes (214 and 215) may become the predetermined amount that is sufficiently small. Further, even if the gap width between the upper fixed electrodes 216 and 217 and the movable electrodes 214 and 215 is not so small, low power driving is possible. Accordingly, the board thickness can be increased in order to suppress deformation due to vibration of the mirror substrate 200. Even in this case, the etching process of the movable electrodes 214 and 215 and the upper fixed electrodes 216 and 217 is easy. Advantages about such process are further described below in relation to the manufacturing process.

Here, the cross-sectional form of each of the upper fixed electrodes 216 and 217 and the movable electrodes of the mirror substrate 200 may be made the shape of a trapezoid as shown in FIG. 2B, and the cross-sectional form of each of the lower fixed electrodes 516 and 517 may be made the shape of an inverted trapezoid. Structures having electrodes in the cross-sectional shapes as above are included in the present invention.

FIGS. 6A through 6I are cross-sectional views for explaining an example of the manufacturing method of the deflection mirror according to Embodiment 2. Along with these drawings, the manufacturing process of the deflection mirror is sequentially described.

Figure 6A:
FIG. 6A through FIG. 6I are cross-sectional views showing a manufacturing method of the deflection mirror according to Embodiment 2 of the present invention.

Process shown by FIG. 6A: A low resistance single-crystal-silicon substrate 701 and a medium resistance single-crystal-silicon substrate 702 that are 525 μm thick are thoroughly cleaned.

A thermal oxidation film 703 is formed on both upper and lower surfaces of the single-crystal-silicon substrate 702 at the thickness of 5000 Å. The two single-crystal-silicon substrates 701 and 702, maintaining the degree of cleanliness, are put in contact with the thermal oxidation film 703 in between, and are temporarily bonded under reduced pressure. Then, a heat treatment at 1100° C. is carried out such that they are directly bonded. Hereafter, the bonded body of two single-crystal-silicon substrates 701 and 702 may be called a silicon wafer.

Figure 6B:

Process shown by FIG. 6B: The low resistance single-crystal-silicon substrate 701, being one of the surfaces of the silicon wafer, from which a mirror substrate, a beam, and a frame section are formed, is ground and polished to 100 μm thickness by a lapping-polishing apparatus.

Figure 6C:

Process shown by FIG. 6C: A thermal oxidation film 704 is formed in thickness of 5000 Å on the surface of the silicon wafer after polishing. That is, the thermal oxidation film 704 to be used as an etching mask is formed on the surface of the silicon substrate 701 of the polished side. As for the thermal oxidation film of the silicon substrate 702 that is not ground and polished, thickness is increased from 5000 Å of the first stage.

Figure 6D:
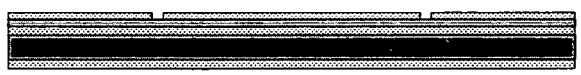

Process shown by FIG. 6D: The thermal oxidation film 704 of the silicon substrate 701 is patterned by a resist mask. Specifically, portions of the thermal oxidation film 704 corresponding to the beams 204 and 204, the circumference of the mirror substrate 200, the inner side of the frame section 205, and the slits 207, 208, and 209 are removed by dry etching using "CF4+H2" gas.

Figure 6E:

Process shown by FIG. 6E: By using the thermal oxidation film 704 after patterning at the above-mentioned process as a mask, penetration etching of the single-crystal-silicon substrate 701 is carried out until it reaches the oxide film 703. Although a rapid deep etching apparatus alternately using high-density plasma of SF6 and C4F8 is used for this etching, since the oxide film 703 has a great etching selectivity ratio to silicon, etching stops when the etching reaches the oxide film 703.

At this juncture, the movable electrodes 214 and 215 and the upper fixed electrodes 216 and 217 are substantially formed. Even when the thickness of the silicon substrate 701 is made great, which increases the etching depth of electrode formation, in order to suppress the deformation due to vibration of the mirror substrate 200, the gap width between the movable electrodes 214 and 215 and the upper fixed electrodes 216 and 217 is not required to be so small. Accordingly, etching for electrode formation is easy.

Figure 6F:

Process shown by FIG. 6F: Patterning is performed on the thermal oxidation film formed on the single-crystal-silicon substrate 702 with a resist mask, and the oxide film inside the frame section 205 is removed by dry etching using CF4+H2 gas.

Figure 6G:

Process shown by FIG. 6G: Penetration etching is carried out on the single-crystal-silicon substrate 702 until etching reaches the oxide film 703. This is carried out by position matching by both side alignment according to the form of the processed single-crystal-silicon substrate 701, and by the oxide mask, having a thickness of 5000 Å, that is patterned with the resist mask.

At this time, etching removal is carried out so that the lower fixed electrodes 516 and 517 may remain beneath the upper fixed electrodes 216 and 217 that are formed in the frame section 205 of the silicon substrate 701. For this etching, the rapid deep etching apparatus providing the high-density plasma of alternate SF6 and C4F8 is used. Since the oxide film 703 that interfaces the single-crystal-silicon substrates 701 and 702 has a great etching selection ratio to silicon, when etching reaches the oxide film 703, etching is stopped.

At this juncture, the lower fixed electrodes 516 and 517 are substantially completed. The interval between teeth of the lower fixed electrodes 516 and 517 for securing the predetermined gap, which is set sufficiently small, between the movable electrodes 214 and 215 and the lower fixed electrodes 516 and 517 is sufficiently greater than the predetermined gap width. Therefore, even if the board thickness of the silicon substrate 702 is great, etching for forming the lower fixed electrodes 516 and 517 is easy, and controlling the width of the lower fixed electrodes 516 and 517 such that the gap width between the movable electrodes 214 and 216 and the lower fixed electrodes 516 and 517 may become the predetermined gap width that is sufficiently small is easy.

Figure 6H:

Process shown by FIG. 6H: A portion of the oxide film 703, the portion holding the mirror substrate 200, the circumference of which is penetrated, is removed by wet etching by hydrofluoric acid. In this manner, the mirror substrate 200 is completed, and becomes capable of rocking centering on the beams 204 and 204. Further, the thermal oxidation films on the surface of the single-crystal-silicon substrates 701 and 702 are simultaneously removed by etching.

Figure 6I:
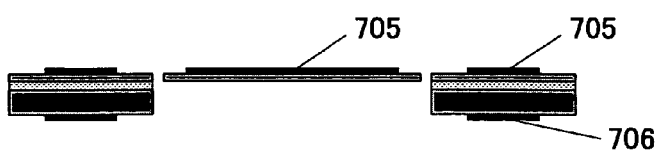

Process shown by FIG. 6I: Aluminum thin films 705 serving as the mirror face 206 and the contact pads 212 and 213 are formed on the surface of the mirror substrate 200 and at the frame section 205 of the silicon substrate 701, respectively, by mask membrane formation by spattering. Further, aluminum thin films 706 serving as the contact pads 520 and 521 are formed on the surface of the silicon substrate 702 to which the etching removal of the oxide film has been performed by mask membrane formation by spattering. Here, although the aluminum thin films are formed by spattering, other materials such as Au can be used, and other film forming methods such as a vacuum deposition method and an ion plating method may be used as long as sufficient conductivity and sufficient adhesion to the silicon wafer are obtained.

Next, operations of the deflection mirror according to Embodiment 2 are described below. The deflection mirror according to Embodiment 2 is driven in the same way as that of the deflection mirror disclosed by above-mentioned Japan Patent Application No. 2003-143326 by the inventor hereto. For example, the mirror substrate 200 is grounded by grounding the contact pad 212, the ground potential being provided through the frame section 205 and the beams 204 and 204. Then, if a voltage is applied to the contact pad 213 that is electrically connected to the upper fixed electrodes 216 and 217, an electrostatic attraction works between the upper fixed electrodes 216 and 217 that face the movable electrodes 214 and 215, respectively through the minute gaps. By minute initial position gaps between the electrodes, the moment of the rotation works on the mirror substrate 200 in the direction that causes the distance between the electrodes to be minimized, and the mirror substrate 200 starts moving/rocking. Then, a pulse voltage having a half cycle of the period of vibration is applied to the upper fixed electrodes 216 and 217, a pulse voltage having the same cycle as the period of vibration in a phase is applied to the lower fixed electrode 516, and a pulse voltage having the same cycle as the period of vibration in a phase that is different by 180° from the above-mentioned phase is applied to the lower fixed electrode 517 such that the mirror substrate 200 further rocks by resonance vibration and the rocking angle is increased.

A first torque is generated on the mirror substrate 200 by the upper fixed electrodes 216 and 217, and the movable electrodes 214 and 215 pass a position closest to the upper fixed electrodes 216 and 217, respectively. At this instant, the pulse voltages are applied to the lower fixed electrode 516 and 517, which generate a second torque that accelerates the mirror substrate 200, the movable electrodes 214 and 215 heading toward the lower fixed electrodes 516 and 517, respectively. Since the gap widths between the lower fixed electrodes 516 and 517 and the movable electrodes 214 and 215 are sufficiently small, the electrostatic force is sufficiently great. Accordingly, even when the thickness of the mirror substrate 200 is great and the moment of inertia is great, the mirror substrate 200 can vibrate for a great deflection angle at a low driving voltage.

In addition, the electrodes can be structured such that the upper fixed electrodes 216 and 217 and the lower fixed electrodes 516 and 517 are not electrically separated. That is, the fixed electrodes 216/516 and 217/517 are made electrically conductive, a level difference is prepared at the middle in the thickness direction (the vertical direction), and the lower part is made wider than the upper part, the lower and upper parts bordering at the position of the level difference. The electrode structure as above is also included in the present invention.

Further, although not illustrated, and although a modification to the manufacturing process is involved, the size relation between the thickness of the movable electrodes and the thickness of the fixed electrodes may be reversed. In this case, the width of a first portion of the movable electrodes, the first portion not countering the fixed electrodes when the mirror substrate is not in motion (when the deflection mirror is being manufactured), is made greater than the width of a second portion of the movable electrodes, the second portion countering the fixed electrodes when the mirror substrate is not in motion (when the deflection mirror is being manufactured). It is evident that the electrodes structured in this manner above also provide the same effect as Embodiment 2. Accordingly, the deflection mirror having the above electrode structure is also included in the present invention.

[Embodiment 3]

The deflection mirror according to Embodiment 3 of the present invention is described with reference to FIG. 7A and FIG. 7B. An outline plan view is shown by FIG. 7A, a cross-sectional view taken along the A–A' line of which is shown by FIG. 7B. In order to facilitate comparison of the deflection mirror according to Embodiment 3 with the deflection mirror according to Embodiment 2, the same reference number is given to the same portion as or the correspondence portion to FIG. 4A and FIG. 4B.

The structure of the deflection mirror according to Embodiment 3 is characterized in that the contact pads 520 and 521 for the lower fixed electrodes 516 and 517, respectively, are formed on the top side of the silicon substrate 203, the top side being exposed by carrying out etching removal to corresponding portions of the frame section 205 and the oxide film 201. In this manner, all the contact pads for the electrodes are prepared on the same side of the deflection mirror, facilitating providing lead wires when mounting the deflection mirror, which is an advantage making the mounting of the deflection mirror simple.

[Embodiment 4]

The deflection mirror according to the present invention can be driven by a further low voltage if the vibrating space of the mirror substrate is enclosed in a reduced pressure state and viscosity resistance is decreased, which also prevents dust, etc., from invading, and enhances reliability. While the enclosure of the mirror substrate may be structured in any desired manner, an example is shown with reference to FIG. 8.

The enclosure includes a cover substrate 822, and a base substrate 823, both being made from, e.g., Pyrex (registered trademark) glass, which as combined enclose a deflection mirror 821, such as the deflection mirror according to the Embodiments of the present invention. The cover substrate 822 is transparent. A concavity 822a is formed to the inner side of the cover substrate 822 such that a vibration space for the mirror substrate is obtained. A concavity 823a is formed to the inner side of the base substrate 823, the concavity 823a also serving as a vibration space for the mirror substrate.

As illustrated in FIG. 8, the cover substrate 822 and the base substrate 823 are joined to portions of the frame section of the deflection mirror 821 by, for example, an anodic bonding system, and enclose the vibrating space of the mirror substrate of the deflection mirror 821 in a reduced pressure state. Further, penetration electrodes 824 are formed in the cover substrate 822, the penetration electrodes electrically leading the contact pads for the electrodes of the deflection mirror 821 to the outside. Here, in the case such as Embodiment 2 where the contact pads are provided on both sides of the deflection mirror, the penetration electrodes for electrically drawing the contact pads to the outside are also formed in the base substrate 823.

In addition, although the bonding method of the cover substrate 822 and the base substrate 823 is not restricted to the anodic bonding system, an enclosure of Pyrex (registered trademark) glass members bonded to silicon by the anodic bonding system provides a stable enclosure over a long period of time. As for the cover substrate 822, other materials such as resin and ceramics may be used so long as at least a window section for passing light is provided. Further, it is also possible to use an enclosure container that accommodates the whole deflection mirror as the enclosure means.

The deflection mirror concerning-the present invention described above is suitable for optical scanning means of an image formation apparatus, such as a printer and a copying machine of a photograph printing method, and the optical scanners thereof. Next, Embodiment 5 is described, which is concerned with such image formation apparatuses and an optical writing apparatus 901 thereof, with reference to FIG. 9.

[Embodiment 5]

Figure 9:
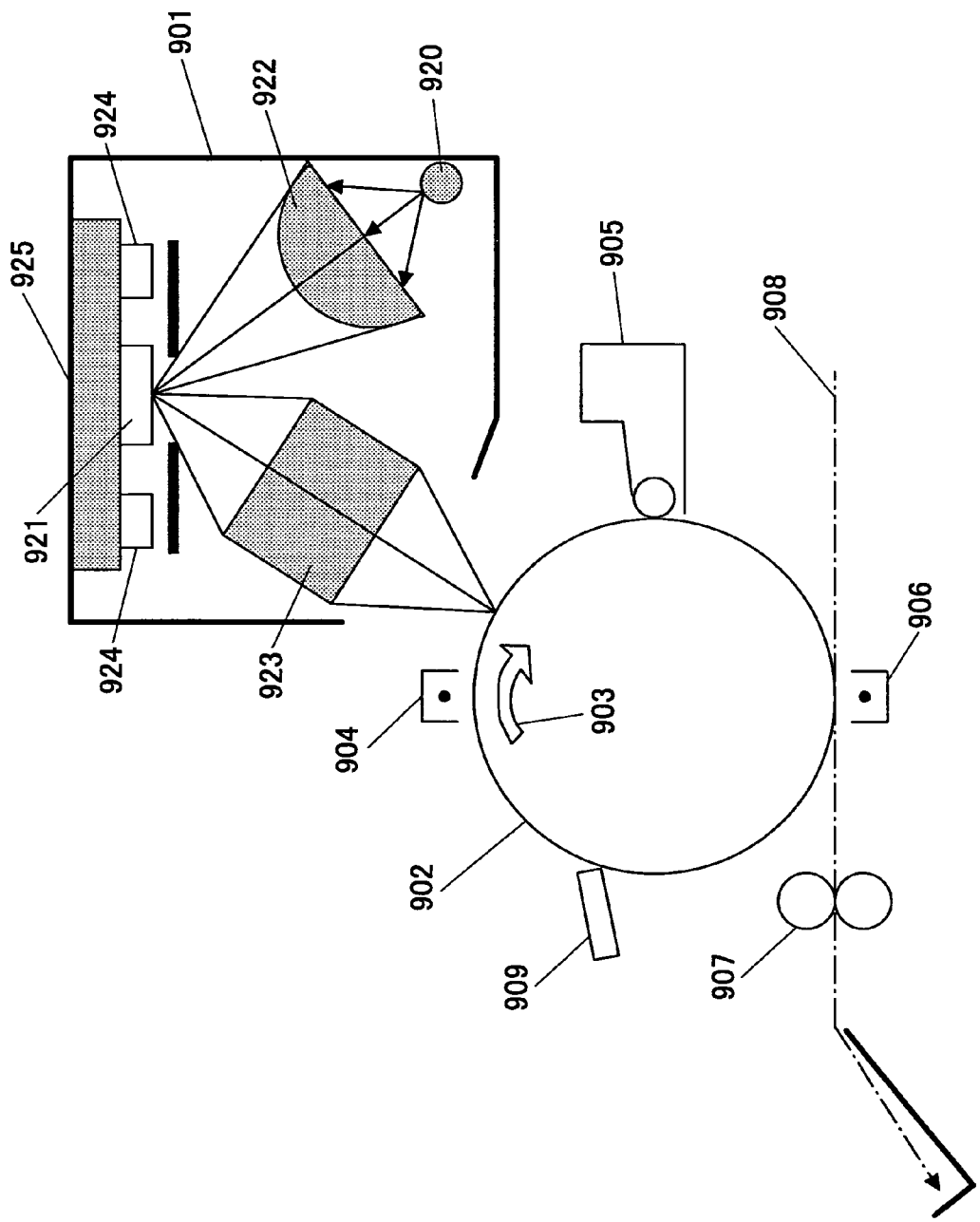
FIG. 9 is a cross-sectional view showing an optical writing apparatus and image formation apparatus according to Embodiment 5 of the present invention.

FIG. 9 is a block diagram of the image formation apparatus and the optical writing apparatus 901 according to Embodiment 5 of the present invention. The optical writing apparatus 901 scans the surface of a photo conductor drum 902, serving an image supporting body.

The optical writing apparatus 901 scans the surface (scanning surface) of the photo conductor drum 902 in the direction of the axle (radial direction) of the photo conductor drum 902 with one or more laser beams that are modulated by a recording signal. The photo conductor drum 902 is rotationally driven in the direction of an arrow 903, and an electrostatic latent image is formed by the optical writing apparatus 901 scanning the surface of the photo conductor drum 902 charged by a charging unit 904. The electrostatic latent image is turned into a toner image that is made visible by a development unit 905, and the toner image is imprinted onto recording paper 908 by an imprint unit 906. The imprinted image is then fixed by a fixing unit 907. Then, a cleaning unit 909 cleans a portion of the surface of the photo conductor drum 902, which portion has passed the imprint unit 906 such that residual toner is removed. Here, it is evident that the photo conductor drum 902 can be replaced with a belt-like photo conductor. Further, it is also possible to once imprint the toner image onto an intermediate imprint medium, to transfer the toner image from the intermediate imprint medium to the recording paper, and then to fix it.

The optical writing apparatus 901 includes a luminous source 920 that irradiates one or more laser beams that are modulated by a recording signal, a deflection mirror 921 that is the deflection mirror according to the present invention, an image-formation optical system 922 for focusing the laser beams from the luminous source 920 to the surface of the mirror substrate of the deflection mirror 921, and a scanning optical system 923 for focusing the laser beams reflected by the surface of the mirror substrate to the surface (scanning surface) of the photo conductor drum 902. The deflection mirror 921 is mounted onto a circuit board 925 with a driving integrated circuit 924, and is assembled into the optical writing apparatus 901.

According to the deflection mirror 921 of the present invention, the thickness of the mirror substrate can be made great such that the deformation due to vibration of the mirror substrate is reduced at a low driving voltage. For this reason, fluctuations of the diameter and the intensity distribution of the laser beams after deflection are reduced. Therefore, the optical writing apparatus 901 is able to perform high-quality optical writing on the photo conductor drum 902, and high-quality picture formation is obtained. Since the power consumption for driving is small compared with a rotating polygon mirror, the deflection mirror 921 is advantageous in view of power savings of the optical writing apparatus 901 and image formation apparatus. Further, wind noise of the mirror substrate of the deflection mirror 921 when vibrating is small compared with a rotating polygon mirror; accordingly, the optical writing apparatus 901 and image formation apparatus with less noise can be provided. Compared with a rotating polygon mirror, the optical writing apparatus 901 requires far less installation space, and further, the deflection mirror 921 emits little heat; accordingly, the optical writing apparatus 901 can be miniaturized. For this reason, the image formation apparatus can be miniaturized.

Here in FIG. 9, other components are the same as conventional image formation apparatuses, and are not illustrated, the components being such as a conveyance mechanism of the recording paper 908, a driving mechanism of the photo conductor drum 902, controllers of the development unit 905 and the imprint unit 906, and a driving mechanism of the luminous source 920.

Further, it is evident that the deflection mirror according to the present invention can be applied to reading scanning systems, such as a bar code reader; and this is included in the present invention.

Further, the present invention is not limited to these embodiments, but variations and modifications may be made without departing from the scope of the present invention.

The present application is based on Japanese Priority Application No. 2004-081466 filed on Mar. 19, 2004 with the Japanese Patent Office, the entire contents of which are hereby incorporated by reference.

What is claimed is:

1. A deflection mirror including a mirror substrate that has a mirror face that reflects a light, a beam, and a supporting member that supports the mirror substrate through the beam, comprising:
a movable electrode that is shaped like comb-teeth formed at a free side of the mirror substrate; and
a fixed electrode that is shaped like comb-teeth, and gears through with the movable electrode at a gap that is formed in the supporting member; wherein
the mirror substrate is driven by electrostatic force between the movable electrode and the fixed electrode, and vibrates centering on the beam; and
an end of at least one of the fixed electrode and the movable electrode is smaller in the thickness direction than the other end.

2. The deflection mirror as claimed in claim 1, wherein cross-sectional forms of the fixed electrode and the movable electrode are in the shape of a trapezoid in the same direction.

3. The deflection mirror as claimed in claim 1, wherein at least the movable electrode and the fixed electrode are formed by single crystal silicon.

4. The deflection mirror as claimed in claim 1, wherein a vibration space of the mirror substrate is enclosed with a reduced pressure.

5. An optical writing apparatus, comprising:
the deflection mirror as claimed in claim 1;
a luminous source that irradiates an optical beam onto a mirror face of the mirror substrate of the deflection mirror; and
a scanning optical system that reflects, focuses and scans the optical beam onto a surface to be scanned.

6. An image formation apparatus comprising:
an image supporting object; and
the optical writing apparatus as claimed in claim 5; wherein
the optical writing apparatus scans the image supporting object by the optical beam modulated by a recording signal such that an electrostatic latent image is formed on the image supporting object by scanning the optical beam.

7. A deflection mirror including a mirror substrate that has a mirror face that reflects a light, a beam, and a supporting member that supports the mirror substrate through the beam, comprising:
a movable electrode that is shaped like comb-teeth formed at a free side of the mirror substrate; and
a fixed electrode that is shaped like comb-teeth and gears through with the movable electrode at a gap that is formed in the supporting member; wherein
the mirror substrate is driven by electrostatic force between the movable electrode and the fixed electrode, and vibrates centering on the beam;
the fixed electrode has a thickness greater than a thickness of the movable electrode; and
the fixed electrode has a wider portion in a region that does not counter the movable electrode when the mirror substrate is stopped than a region that counters the movable electrode when the mirror substrate is stopped.

8. The deflection mirror as claimed in claim 7, wherein the fixed electrode has a level difference at the middle in the thickness direction, and the width above the level difference is different from the width below the level difference.

9. The deflection mirror as claimed in claim 8, wherein the fixed electrode is divided into two parts in the thickness direction bordering at the position of the level difference, and the divided parts are electrically insulated from each other.

10. The deflection mirror as claimed in claim 9, wherein contact pads of the two parts of the fixed electrode and contact pads of the movable electrode are provided on the same side.

11. A deflection mirror manufacturing method of manufacturing the deflection mirror as claimed in claim 7, wherein the movable electrode and fixed electrode of the deflection mirror are formed by bonding two silicon substrates with an insulated layer in between, by positioning, and by etching by high-density plasma from both sides of the bonded substrate.

12. A deflection mirror including a mirror substrate that has a mirror face that reflects a light, a beam, and a supporting member that supports the mirror substrate through the beam, comprising:

a movable electrode that is shaped like comb-teeth formed at a free side of the mirror substrate; and a fixed electrode that is shaped like comb-teeth, and gears through with the movable electrode at a gap that is formed in the supporting member; wherein the mirror substrate is driven by electrostatic force between the movable electrode and the fixed electrode, and vibrates centering on the beam;

the movable electrode has a thickness that is greater than a thickness of the fixed electrode; and the fixed electrode has a wider portion in a region that does not counter the movable electrode when the mirror substrate is stopped than a region that counters the movable electrode when the mirror substrate is stopped.

13. The deflection mirror as claimed in claim 12, wherein the movable electrode has a level difference at the middle in the thickness direction, and the width above the level difference is different from the width below the level difference.

* * * * *